United States Patent
Johnson et al.

(10) Patent No.: US 8,387,252 B1
(45) Date of Patent: Mar. 5, 2013

(54) BOILER TUBE CLAMP AND METHOD OF USING SAME

(75) Inventors: Kurt Johnson, Ringgold, GA (US); Robert Hunter, Ringgold, GA (US); David Duplissey, Chattanooga, TN (US)

(73) Assignee: National Boiler Service, Inc., Trenton, GA (US)

(*) Notice: Subject to any disclaimer, the term of this patent is extended or adjusted under 35 U.S.C. 154(b) by 353 days.

(21) Appl. No.: 12/575,227

(22) Filed: Oct. 7, 2009

(51) Int. Cl.
*B25D 51/24* (2006.01)
*B23Q 3/00* (2006.01)
*B23P 19/04* (2006.01)

(52) U.S. Cl. .................. 29/890.051; 269/287; 29/256

(58) Field of Classification Search .............. 269/200, 269/257, 189, 238–240, 287; 29/890.051, 29/281.5, 267, 282, 464, 244, 234, 237–239, 29/256; 81/484, DIG. 9; 254/20, 29 R, 30
See application file for complete search history.

(56) References Cited

U.S. PATENT DOCUMENTS

| | | | |
|---|---|---|---|
| 1,273,484 A * | 7/1918 | Hammer .................. | 254/20 |
| 1,596,464 A * | 8/1926 | Smith ..................... | 29/267 |
| 1,640,137 A | 8/1927 | Thomas | |
| 1,734,060 A | 5/1929 | Thomas | |
| 1,983,050 A | 4/1934 | Sizer | |
| 2,165,221 A | 11/1939 | Burton | |
| 2,308,340 A * | 1/1943 | Newlon .................. | 269/189 |
| 2,933,126 A | 4/1960 | Webber | |
| 3,260,270 A | 12/1966 | Watkins | |
| 3,422,519 A * | 1/1969 | Fehlman .................. | 29/281.5 |
| 4,195,828 A | 4/1980 | Peterson | |
| 4,655,481 A | 4/1987 | Prueter | |
| 5,141,276 A | 8/1992 | McClure | |
| 5,481,793 A | 1/1996 | McClure | |
| 6,783,101 B2 | 8/2004 | Knotts | |
| 7,150,439 B2 * | 12/2006 | Konold .................. | 248/74.1 |
| 7,195,143 B2 | 3/2007 | Reeson | |
| 2008/0163729 A1* | 7/2008 | Stevens ................. | 81/319 |
| 2008/0263850 A1 | 10/2008 | Dwileski | |
| 2009/0096210 A1 | 4/2009 | Maunder | |

* cited by examiner

*Primary Examiner* — Hadi Shakeri
(74) *Attorney, Agent, or Firm* — C. Brandon Browning; Maynard Cooper & Gale, PC

(57) ABSTRACT

A boiler tube clamp including a first portion having a first substantially U-shaped midsection with a first inner surface configured for receiving and pressing against one side of a boiler tube, a first hinge member arranged on one end of the first midsection, and a threaded bolt hingedly attached to the other end of the first midsection, and a second portion having a second substantially U-shaped midsection with a second inner surface configured for receiving and pressing against the other side of the boiler tube. The clamp further includes a second hinge member arranged on one end of the second midsection and hingedly connected to the first hinge member so that the first inner surface and the second inner surface close toward one another. An open slot is arranged at the other end of the second midsection configured for detachably receiving the threaded bolt. A lip extends radially out from an outer surface of the second midsection and arranged adjacent to an edge thereof. A jackscrew extends through the lip for adjusting the distance a boiler tube contained by the clamp extends into a boiler through a boiler header.

2 Claims, 4 Drawing Sheets

BOILER TUBE CLAMP AND METHOD OF USING SAME

FIELD OF INVENTION

The present invention relates to a boiler tube clamp. More particularly, the invention relates to a clamp used for installing vertically arranged boiler tubes in a boiler header or drum of a conventional boiler.

BACKGROUND OF INVENTION

When installing boiler tubes, it is necessary that relatively long and heavy boiler tubes be lifted and oriented in a generally vertical position especially when replacing boiler tubes. An extra large device for installing boiler tubes is disclosed in U.S. Pat. No. 5,141,276, which is directed to a boiler tube gripper including a pair of pivotally connected members for lifting and positioning boiler tubes vertically. Each of the members is generally hook-shaped and provided with a generally semi-cylindrical inner surface to form a cylindrical opening when the pivotal members are pivoted to a closed position. In the closed positioned, the members encircle a boiler tube or pipe. A lift element is connected to one of the pivotal members at the periphery thereof to tilt the closed gripper which causes the diametrically opposed upper and lower edges of the closed gripper to engage the adjacent and remote surfaces of a boiler tube or pipe being gripped while being lifted and handled. The free ends of the pivotal members have a pin securing them in closed position with the pin being tethered to retain it in accessible position with the tether also serving to effectively release the pivotal members by pivoting one of the members toward open position. A lateral opening on one of the pivotal member enables assembly laterally onto the boiler tube with the other pivotal member then being simply pivoted into closed position and the pin inserted to secure the gripper to the tube or pipe.

SUMMARY OF THE INVENTION

The present invention is directed to a boiler tube clamp for vertically arranging and installing a boiler tube in a boiler header or drum. In one aspect of the invention, there is provided a clamp including a first portion having a first substantially U-shaped midsection with a first inner surface configured for receiving and pressing against one side of the boiler tube. A first hinge member is connected to one end of the first midsection and a threaded bolt is hingedly attached to the other end of the first midsection. The clamp further includes a second portion having a second substantially U-shaped midsection with a second inner surface configured for receiving and pressing against the other side of the boiler tube. A second hinge member is connected to one end of the second midsection and hingedly connected to the first hinge member so that the first inner surface and the second inner surface close toward one another. An open slot is formed within the other end of the second midsection for detachably receiving the threaded bolt. A nut is used to the tighten the bolt to the slot for maintaining the clamp in a closed position about a boiler tube.

In use, the clamp is immobily and detachably secured to the boiler tube in the closed position and situated on top of the boiler header with the boiler tube extending a desired distance beyond a bottom side or inside surface of the boiler header. The substantially U-shaped midsections of the first and second portion close about the boiler tube forming a cylinder-like structure that snuggly secures the boiler tube therein. The desired distance is preferably not less than ¼ inch and no more than ¾ inch. To adjust the position of the clamp relative to a boiler header when the desired distance is not initially achieved, a lip can be provided that extends radially out from an outer surface of the second midsection adjacent to an edge thereof. The lip serves as a point against which the clamp can be pried away and lifted from a surface of the boiler header using a pry bar. Alternatively, the clamp can include a jackscrew that can be positioned to extend between a top of the boiler header and the lip of the clamp. To obtain the desired distance, the screw is rotated thereby either lifting or lowering the boiler tube. Once the boiler tube extends through the boiler head the desired distance, the boiler tube is fixed to the boiler header using conventional means, and the clamp is pivoted into an opened position and removed from about the boiler tube.

According to another aspect of the invention there is provided a method of installing a boiler tube in a boiler header or drum. The method includes providing a clamp having a first substantially U-shaped portion hingedly coupled to a second substantially U-shaped portion, pivoting the first portion and the second portion into an opened position and inserting the boiler tube between the first portion and the second portion. Thereafter, the first portion and the second portion are pivoted into a closed position about a predetermined location of the boiler tube thus detachably and immobily securing the clamp to the predetermined location. In the closed position, the clamp is adapted for supporting the boiler tube in a vertical arrangement without the boiler tube moving relative to the clamp. Once the clamp is fixed to the boiler tube, the boiler tube is vertically arranged and then inserted into an opening through a topside of the boiler header until the boiler clamp contacts or is supported on top of the boiler header. At this point, the boiler tube extends into the boiler header a distance. To obtain a desired distance, a jackscrew is coupled between the clamp and the boiler header which can be rotated to either increase or decrease the distance. Alternatively, a pry bar can be inserted between a radial lip on an exterior portion of the clamp and the boiler header which is used to pry the clamp away from the boiler header thus decreasing the distance the boiler tube extends beyond the bottom side or inside surface of the boiler header.

According to yet another aspect of the invention, there is provided a method of installing a single boiler tube in a boiler header or drum. The method includes detachably securing the boiler tube clamp to a predetermined location on a lower end of the single boiler tube, arranging the single boiler tube vertically, extending the lower end of the single boiler tube through a topside the boiler header to a distance beyond a bottom side or inside surface of the boiler header, and supporting the boiler clamp on the topside of the boiler header. A grasping portion of the boiler tube clamp can be raised or lowered relative to the topside of the boiler header by manipulating an adjustment member that is rotatably coupled to the grasping portion of the clamp.

DETAILED DESCRIPTION OF THE INVENTION

Figure 6:
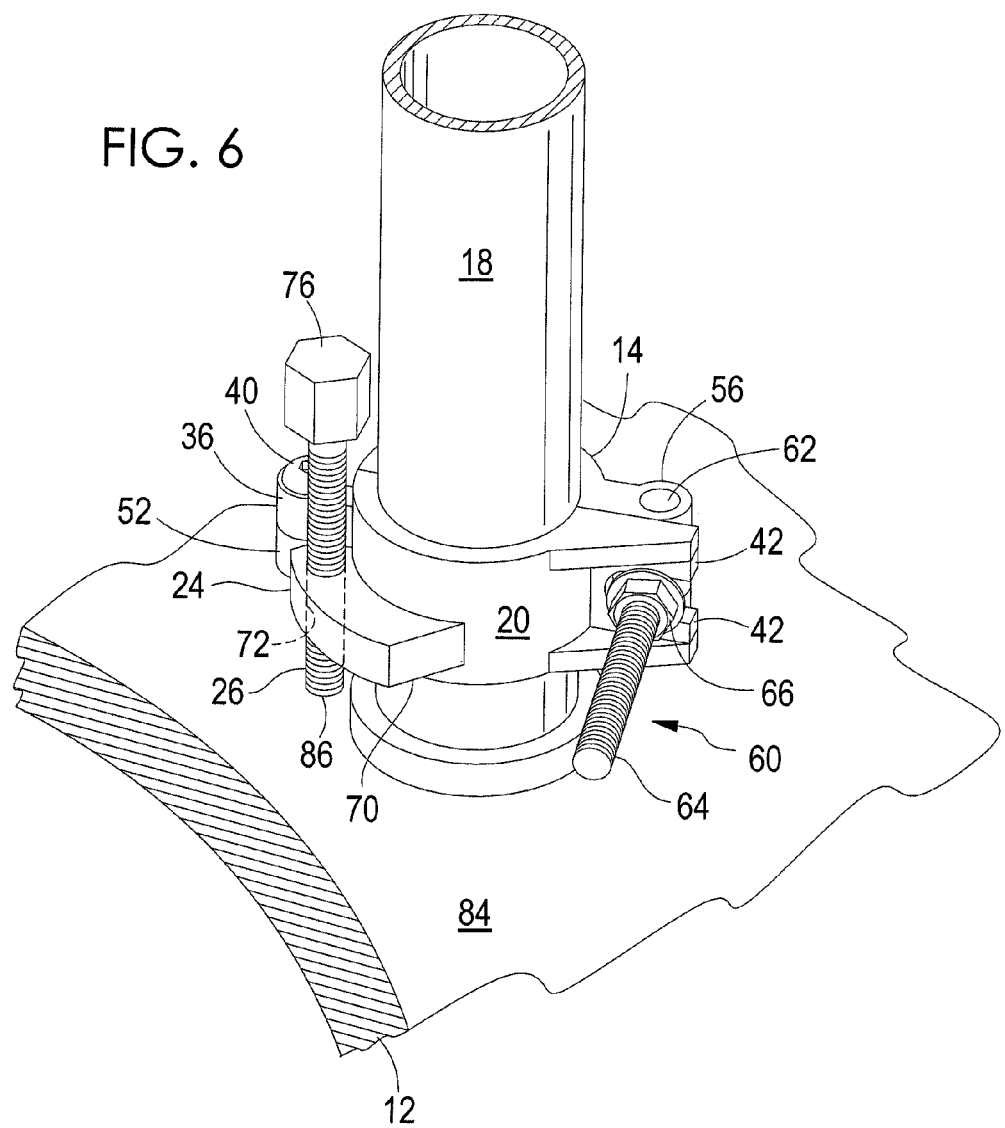
FIG. 6 is a perspective view of the clamp of FIG. 1 inserted into a boiler header.
Figure 7:
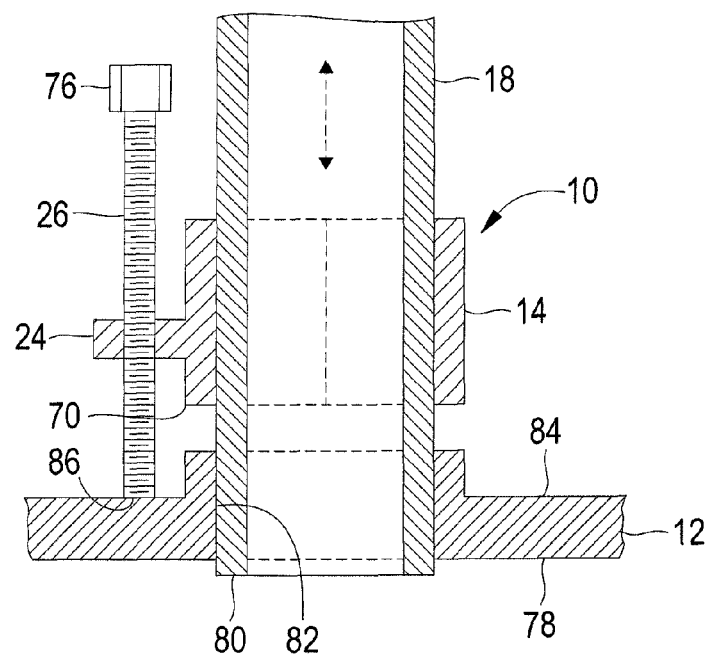
FIG. 7 is a sectional view of the clamp and boiler header of FIG. 6.
Figure 8:
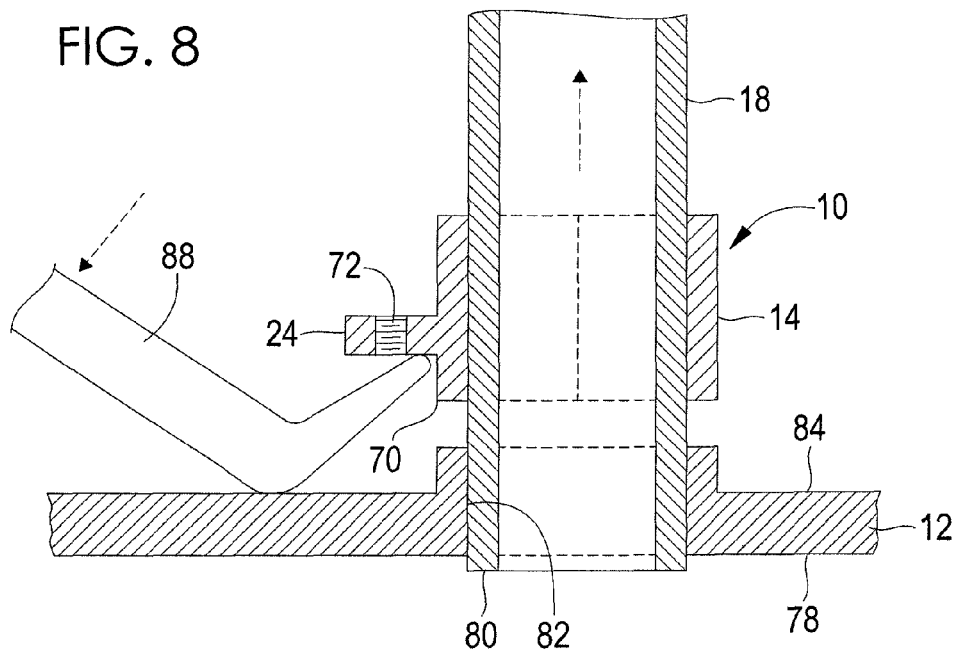
FIG. 8 is a sectional view of the claim of FIG. 6 being lifted using a pry bar.

FIGS. 1 through 5 depict a metal boiler tube clamp 10 in accordance with a preferred embodiment of the present invention. FIGS. 6 through 8 depict boiler tube clamp 10 inserted into a boiler header 12 or drum of a conventional boiler. Generally, boiler tube clamp 10 is made up of a first portion 14 configured for receiving and pressing against a side of a boiler tube 18 hingedly coupled to a second portion 20 configured for receiving and pressing against another side of boiler tube 18. A radial lip 24 extends outwardly from second portion 24 and contains a jackscrew 26 for adjusting the distance boiler tube 18 extends through boiler header 12. More particularly, referring to FIGS. 1 through 5, first portion 14 of clamp 10 includes a U-shaped midsection having an inner surface 28, an exterior surface, a locking end 32 and a pivot end 34. Inner surface 28 is shaped and sized to receive and press securely against boiler tube 18 when clamp 10 is in a closed position. Thus, inner surface 28 has a radius and partially defines a circumference between locking end 32 and pivot end 34 that are complimentary to the radius and circumference of boiler tube 18. Extending outwardly from and essentially perpendicular to the exterior surface of first portion 14 at pivot end 34 is an arm 36 having an opening there through for receiving a pivot pin 40. Arm 36 and the opening there through are provided for hingedly coupling first portion 14 and second portion 20 with the aid of pin 40.

Similar to first portion 14, second portion includes a U-shaped midsection having an inner surface 46, an exterior surface, a pivot end 50 and a locking end 51. Further, inner surface 46 of second portion 20 is shaped and sized to receive and press securely against boiler tube 18 when clamp 10 is in a closed position, and therefore, it has a radius and partially defines a circumference that are complimentary to the radius and the circumference of boiler tube 18. When closed against one another, first portion 14, and second portion 20 form a cylinder adapted to securely and immobily receive boiler tube 18.

Pivot end 50 of second portion 20 is also similar to pivot end 34 of first portion 14 in that pivot end 50 includes an arm 52 having an opening there through. The opening through arm 36 of first portion 14 and the opening through arm 52 of second portion 20 are arranged to be aligned and to receive pivot pin 40 about which first portion 14 and second portion 20 can rotate between the closed position for containing boiler tube 18 and an open position for receiving and releasing tube 18. Extending along a plane formed by arm 52 and opposite thereto is a truss-supported rectangular plate 42 having an elongated open slot 44. Slot 44 is arranged along locking end 51 to open away from pivot end 50 of second portion 20.

Figures 1, 2:
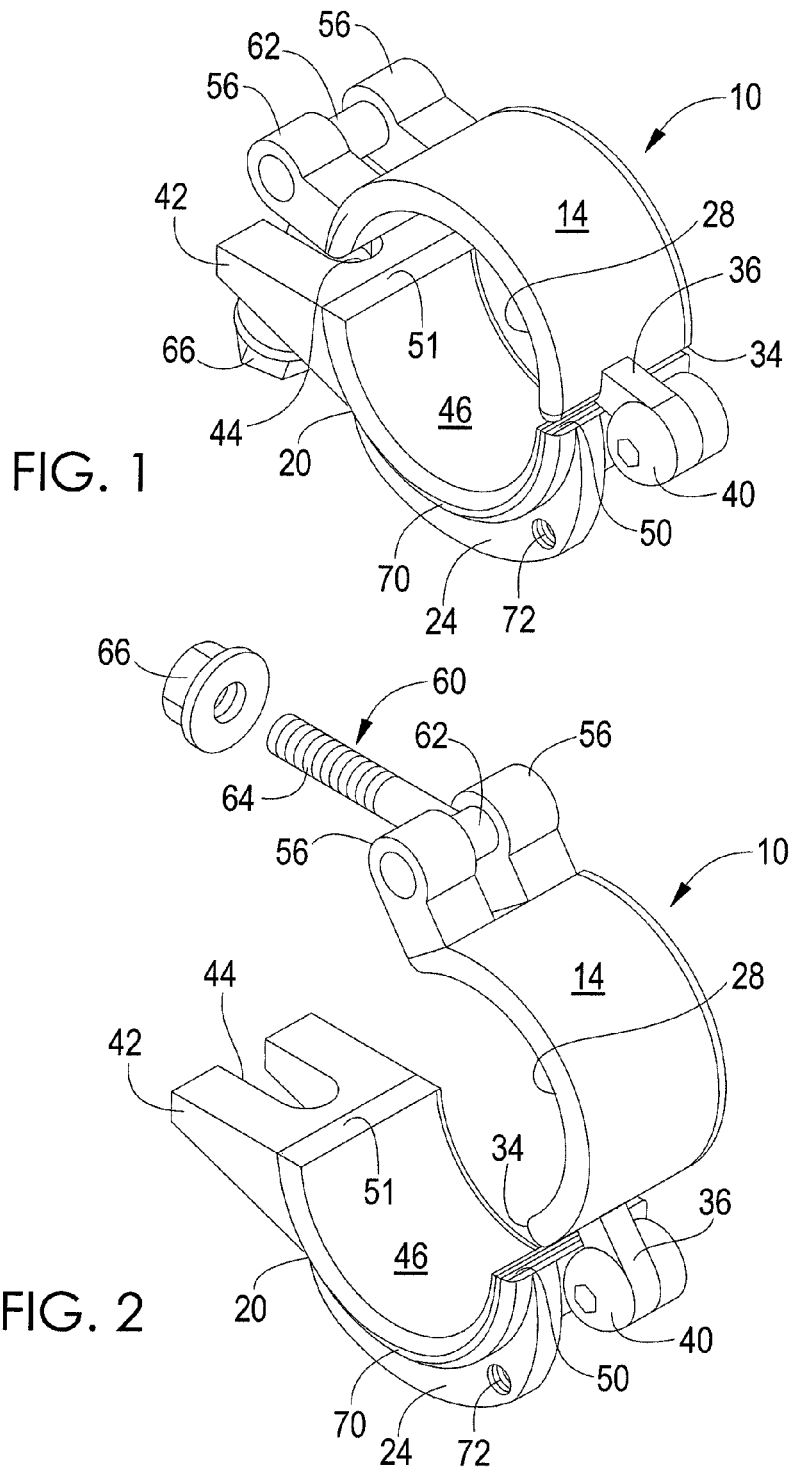
FIG. 1 is a perspective view of a boiler tube clamp in accordance with a preferred embodiment of the present invention.
FIG. 2 is a perspective view of the boiler tube clamp of FIG. 1 in an open configuration.
Figure 3:
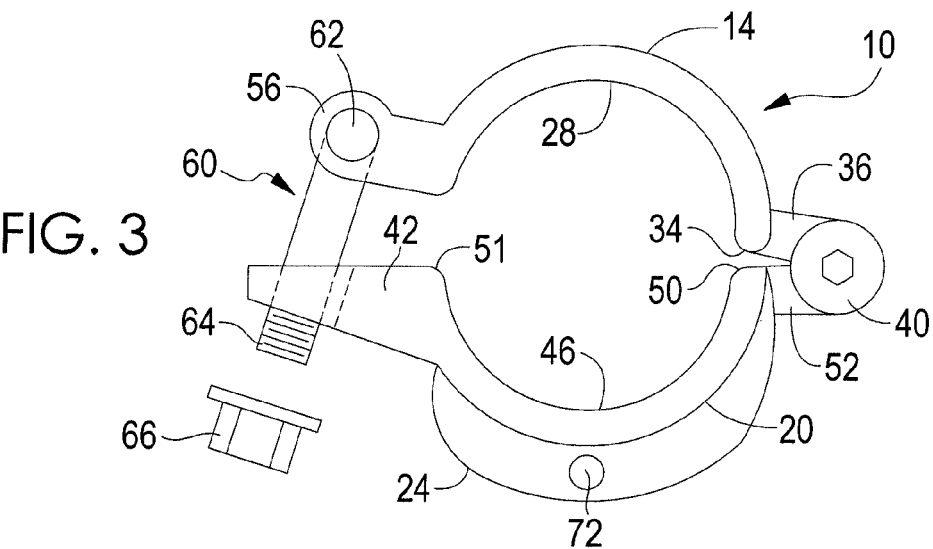
FIG. 3 is a top plan view of the clamp of FIG. 1.
Figure 4:
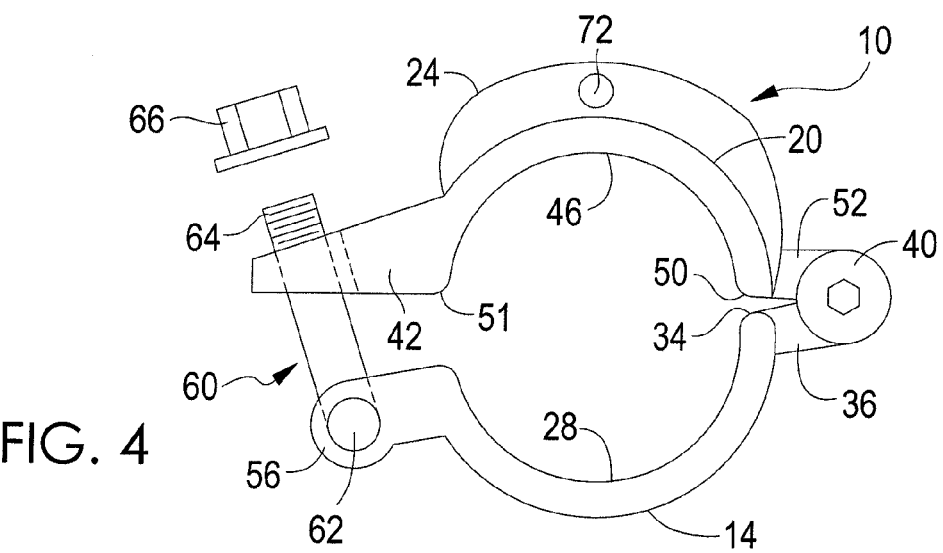
FIG. 4 is a bottom plan view of the clamp of FIG. 1.
Figure 5:
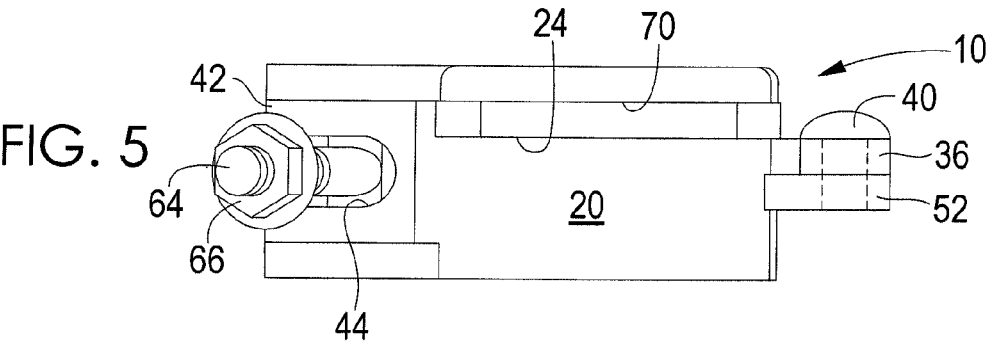
FIG. 5 is an elevational view of the clamp of FIG. 1.

Second portion 20 further includes the flat, U-shaped radial lip 24 that extends radially out from the exterior surface thereof a short distance and adjacent to a lower edge 70 of the midsection of second portion 20. As depicted in FIG. 2, lip 24 originates from pivot end 50, adjacent to arm 52, and extends partially around the exterior surface of second portion 20. A threaded hole 72 is provided through a central portion of lip 24 which is adapted to receive jackscrew 26. Jackscrew 26 is arranged so that the hexagonal head 76 of the jackscrew is positioned opposite lower edge 70 relative to lip 24.

To maintain clamp 10 in the closed position, opposite to pivot end 34 of first portion 14, a pair of arms 56 are provided which extend essentially perpendicular and out from the exterior surface of the midsection of first portion 14. At the end of each of arms 56 are openings which are aligned and adapted to receive a T-shaped, rotatable locking bolt 60. Locking bolt 60 includes a pivot piece 62 that extends through and between the aligned openings in arms 56 and a threaded portion 64 extending perpendicular to pivot portion 62 between arms 56. To secure clamp 10 in the closed position, first portion 14 and second portion 20 are pivoted toward one other about pivot pin 40 from the opened position, with inner surface 28 opening toward inner surface 46 to form a cylinder, until plate 42 comes into contact with arms 56. Thereafter, locking bolt 60 is pivoted about pivot piece 62 in the aligned openings of arms 56 until threaded portion 64 is positioned within slot 44 of plate 42. Plate 42 is pressed and secured against arms 56 by tightening a nut 66 onto threaded portion 64. In the closed position, clamp 10 is secured to boiler tube 18 well enough that when tube 18 is oriented vertically, clamp 10 can immobily hold tube 18 between inner surfaces 28 and 48 without boiler tube 18 sliding there between.

Referring to FIGS. 6 and 7, in use, clamp 10 is detachably secured in the closed position to boiler tube 18 at a predetermined location along the tube. The location is based upon the desired distance boiler tube 18 is to extend out of a bottom side 78 of boiler header 12. Preferably, the distance is not less than ¼ inch and no more than ¾ inch beyond a bottom side 78 of boiler header 12. Thus, the predetermined location is measured from a lower end 80 of boiler tube 18 and is based upon the preferred distance, i.e., not less than ¼ inch and no more than ¾ inch, plus the thickness of boiler header 12 or the length of aperture 82 through boiler header 12. Clamp 10 is oriented about boiler tube 18 with lower edge 70 of second portion 20 aligned with the predetermined location. This way, the length of boiler tube 18 extending beyond lower edge 70 is equal to the preferred distance, i.e., not less than ¼ inch and no more than ¾ inch, plus the thickness of boiler header 12 or the length of aperture 82 through boiler header 12.

With clamp 10 securely coupled about boiler tube 18, the tube is arranged vertically above a topside 84 of boiler head 12 and aligned with aperture 82. Lower end 80 of boiler tube 18 is then lowered into aperture 82 until either lower edge 70 of second portion 20 or a terminus 86 of jackscrew 26 comes into contact with topside 84 thereby arresting further lowering of tube 18 into aperture 82. Thereafter, the distance that boiler tube 18 extends beyond bottom side 78 of boiler header is measured. In the event the distance is too great or too small, boiler tube 18 can be raised or lowered by rotating jackscrew 26 within threaded hole 72 of lip 24. When the distance is too great, jackscrew 26 is rotated so that the length thereof between lip 24 and topside 84 of boiler header 12 is increased thus lifting boiler tube 18 relative to topside 84. On the other hand, if the distance is too small, jackscrew 26 is rotated in the opposite direction so that the distance between lip 24 and topside 84 of boiler header 12 is decreased thus lowering boiler tube 18 relative to topside 84.

Referring to FIG. 8, there is depicted an alternative method of lifting boiler tube 18 for ensuring that boiler tube 18 extends out of bottom side 78 of boiler header 12 the desired distance, for example, if jackscrew 26 is absent or too short. According to the alternative method, in the event the distance is too great, boiler tube 18 can be raised by inserting a pry bar 88 between lip 24 and topside 84 of boiler header 12 and manually pressing down on the pry bar at an end of the pry bar opposite to lip 24. Once boiler tube 18 is lifted to the desired height above topside 84, blocks or the like can be placed under lip 24 to maintain the desired height and distance the tube extends beyond the bottom side of boiler header 12. Thereafter, pry bar 88 can be removed.

Once boiler tube 18 is positioned at the desired distance, the tube is fixed in place using conventional means. Thereafter, nut 66 is loosened about threaded portion 64 of locking bolt 60, bolt 60 is pivoted out of slot 44 and first portion 14 is pivoted away from second portion 20 placing clamp 10 in a open position so that it can be removed from about boiler tube 18.

As will be apparent to one skilled in the art, various modifications can be made within the scope of the aforesaid description. Such modifications being within the ability of one skilled in the art form a part of the present invention and are embraced by the claims below.

It is claimed:

1. A method of installing a single boiler tube in a boiler header comprising,
    detachably securing a boiler tube clamp to a predetermined location on a lower end of the single boiler tube,
    arranging the single boiler tube vertically,
    extending the lower end of the single boiler tube through a topside the boiler header and a distance beyond a bottom side of the boiler header,
    supporting the boiler tube clamp on the topside of the boiler header,
    pivoting a first portion and a second portion of the clamp into an opened position, pivoting the first portion and the second portion into a closed position around the predetermined location, pivoting a threaded bolt of the first portion into an open slot in the second portion, tightening a nut on the threaded bolt, and detachably securing the first portion and the second against the single boiler tube,
    adjusting the distance the lower end of the single boiler tube extends beyond the bottom side of the boiler header by adjusting an adjustment member integral with the clamp, and
    rotating the adjustment member within an outwardly extending radial lip of the boiler clamp in a first direction to increase the distance and rotating the adjustment member in a second direction to decrease the distance.

2. The method according to claim 1 further comprising supporting the clamp on the topside of the boiler header by contacting the clamp directly to the boiler header.

* * * * *